Patented Aug. 21, 1951

2,565,404

UNITED STATES PATENT OFFICE 2,565,404

STARCH CONVERSION PROCESS

Max A. Staerkle, Baech, and Emil Meier, Waedenswil, Switzerland, assignors to Blattmann & Co., Waedenswil, Switzerland, a firm of Switzerland No Drawing. Application March 29, 1947, Serial No. 738,225. In Switzerland April 4, 1946

11 Claims. (Cl. 127—38)

This invention relates to what may be termed a "dry" process for the conversion or degradation of starch, in which starch is treated as a mass of acidulated solids in a commercially dry to moist state, in such manner as to achieve important economies and improvements of process control.

The invention deals particularly with a process by which starch can be converted into hydrolyzed products possessing a degree of degradation desired for industrial and food purposes, typical products being glucose or starch syrup and starch sugar. All common starches, such as potato starch, tapioca starch, wheat starch, corn starch, and the like, can be used in this process.

The production of such products has been carried out heretofore by methods using aqueous suspensions of starch. In these methods it has been necessary to use large quantities of the chemical degrading agents, usually acids, in proportion to the quantities of starch, in order to obtain the concentration of reagent needed for proper hydrolysis of the reaction material. Expensive plants also are required, since the equipment used must be resistant to strong chemicals. Furthermore, the methods using aqueous suspensions often are undesirable, such as in the production of starch syrup or starch sugar, because the greater part of the water used in the suspensions must be evaporated in order to obtain the desired end product.

The purpose of the present invention is to provide a new process of producing starch hydrolysis products which avoids these disadvantages and brings about other important benefits.

This invention makes use of the discovery that the natural water content of starch, such as commercially dry starch, can be utilized in such manner as to obtain hydrolyzed starch conversion products substantially as good as or better than those obtained by known methods utilizing aqueous suspensions of starch, and at materially reduced costs of production. According to this invention, starch in its usual commercial forms is impregnated with an acidic starch degrading agent so as to form an acidulated mass of starch solids in a commercially dry to moist state, i. e., which contains water not substantially in excess of a condition of moistness, and this mass is heated and hydrolyzed with its own water content by the heating and the chemical action, while care is taken to prevent any substantial losses of water from the reaction material, until the desired degradation product is obtained.

The water present is held in the material, without being driven out or migrating in it while it is being heated, by subjecting the material to sufficient counter-pressure preferably from a gas forced into the reaction space from the exterior of the reaction container. The gas used is one which is unreactive or harmless to the material, such as air or nitrogen. The pressure to be exerted by it depends upon the heating temperature being used, since the pressure applied must counteract the vapor pressure of the water present in the starch material. In a part of the heating period, after effecting a preliminary hydrolysis by heating only from reaction container surfaces, the heating and saccharification are accelerated by injecting steam under pressure into the reaction material.

The reactions brought about in this way make use of the water inherently contained or bound in the starch, to form glucose or the like as the desired reaction product. Under the conditions herein set forth the degradation of heterogeneous molecular constituents of the starch and chemical union thereof with water naturally present in the reaction mass take place substantially homogeneously throughout the mass, so as to yield improved products unusually free of dextrinization. This is also advantageous in that the conversion can be carried out as a dry process, from which a number of important benefits result, such as, for example, avoidance of the extensive evaporation heretofore required for the removal of excess water from commercial glucose and like products as heretofore produced.

Above all, the conversion can be achieved with a great reduction in the required quantities of chemicals, which yields economies and other advantages.

Furthermore, instead of requiring acid-proof containers, this process can be carried out satisfactorily in ordinary or cast iron vats, autoclaves, drums, or the like, suitably closed and provided with suitable stirring mechanisms, etc., heating facilities and means for introducing gases under pressure. The starch degrading agents used, as already indicated, are usually acids. If desired, vacuum can be applied in a preliminary phase of the heating as a means of effecting preliminary degradation at low temperatures, or in order to evacuate the reaction container, if desired, before introducing steam as hereinafter described.

This process offers the further unique advantage that the conversion of starches into hydrolyzed products such as commercial glucose, dextrose, or the like, can be carried out continuously, so as to obtain the benefits of improved process control, economy, and reduced equipment requirements which a continuous mode of operation entails. For the continuous practice of this process, reaction drums similar to cement kilns can be used in place of the customary autoclaves or vats equipped with stirring mechanisms.

At a certain point of time in the conversion of the starch, depending upon the operating conditions, the solids forming the reaction material tend to stiffen or thicken to a tough, dough-like mass which can be kept in motion only with a great expenditure of power to move the stirring mechanism. When this occurs it is likely to cause formation of lumps, and heat supplied to the material from the outside is then distributed into the material slowly and in a non-uniform manner. Among other disadvantages, local overheatings may result, which produce non-homogeneous degradation products having an impure so-called dextrin flavor.

This tendency toward stiffening may be particularly disadvantageous in the continuous mode of operation, because it hinders the constant flow of the mass through the reaction zone. Further, the material remains too long in this zone, becoming subject to overheating and poor heat distribution which again may lead to the above-mentioned disadvantages.

It has been discovered that these defects can be avoided or eliminated in the simplest manner if the reaction mass, in addition to being heated by supplying heat from the outside through the walls of the reaction container, is also heated directly by forcing steam under pressure, i. e. live steam, into contact with the material.

This additional heating is advantageously done at or shortly before the moment when stiffening of the mass is to be expected, but it may also be carried out later. The stiffening is thus prevented, or is rapidly eliminated in case it has already taken place.

By an appropriate choice of the pressure and temperature of the steam introduced, conditions can be maintained such that the heating of the material takes place rapidly and uniformly without local overheating, and thus the process of saccharification of the partially hydrolyzed starch is accelerated and the range of stiffening is rapidly by-passed.

This mode of operation is particularly advantageous in the continuous process, because it avoids any detentions of the mass in the reaction zone by reason of stiffening.

It is also possible, while introducing steam, to keep the reaction material under a separate superatmospheric pressure from another gas such as air or nitrogen applied from the exterior of the container, in addition to the steam pressure.

The utilization of this additional pressure in combination with steam is particularly advantageous in the continuous mode of operation of this process. For one thing, it prevents losses of water from the material in the reaction zone. Furthermore, the steam is prevented from penetrating beyond the desired reaction zone into the new, incoming reaction material, which would cause the moisture content to become too great and make the active reaction zone too extensive.

The present process cannot be practiced with heating of the reaction material only by the introduction of steam, i. e., without supplying convection heat through the walls of the vessel, for this would not bring about the desired results. It causes an intolerable increase in the water content in the reaction mass, making it become pasty and subject to undesired reactions and effects and, incidentally, conflicting with the purpose of utilizing as little water as possible.

The introduction of steam gives advantages even though there be no tendency for the reaction mass to stiffen, because the progress of the degradation is thereby accelerated and made more uniform, which results in a saving of operating time, better utilization of the available equipment, and still more uniform degradation products.

Practical uses of this invention will be further understood from the following example.

*Example*

2000 kg. of commercially dry potato starch are impregnated with 6.5 liters of 38% HCl dissolved in 50 liters of water. The starch thus treated is transferred to a heatable autoclave provided with stirring mechanism. There it is put under the pressure of air or nitrogen at 2 atmospheres gage pressure and is heated to 100° C. Without stopping the external heating, superheated steam is then injected into the reaction vessel, until the temperature of the contents has been raised to 130° C. The steam pressure corresponding to this temperature is about 3 atmospheres. The steam may then be turned off. By means of the container-heating alone the contents are now held at 130° C. until a sample tested by means of the iodine reaction shows the desired degree of saccharification.

While the practice of this invention has been exemplified by the specification of various details and examples, it will be understood that these may be varied with plant equipment or operating requirements, with raw materials and with particular qualities desired in the products, without departing from the spirit or the scope of the disclosed invention which is intended to be defined by the appended claims.

We claim:

1. A process for converting starch into hydrolyzed starch products, wherein a commercially dry to moist mass of acidulated starch solids is heated and stirred in an enclosed reaction space at a temperature sufficient to saccharify the starch until a desired degree of saccharification has been produced, which comprises maintaining the mass while it is being heated during at least a period of preliminary hydrolysis under a counterpressure from an externally applied gas sufficient to prevent vaporization of water present in the material, and injecting live steam into the pre-hydrolyzed mass at about the stage when it tends to stiffen so as to accelerate the heating and saccharification.

2. A process as described in claim 1 wherein the steam injected is superheated steam under pressure.

3. A process for converting starch into hydrolyzed starch products, wherein a commercially dry to moist mass of acidulated starch solids is heated and stirred in an enclosed reaction space at a temperature sufficient to saccharify the starch until a desired degree of saccharification has been produced, which comprises maintaining the mass while it is being heated under a counterpressure from an externally applied gas sufficient to prevent vaporization of water present in the material, until the starch is hydrolyzed to a stage at which the mass tends to stiffen objectionably, and then injecting live steam under pressure into the mass to accelerate the heating and saccharification and thereby avoid objectionable stiffening of the mass.

4. A process for converting starch into hydrolyzed starch products, wherein a commercially dry to moist mass of acidulated starch solids in an enclosed reaction space is stirred and heated from surfaces of the reaction container at a temperature sufficient to saccharify the starch until a desired degree of saccharification has been produced, which comprises maintaining the mass during a first period of hydrolysis under a counterpressure from an externally applied gas sufficient to prevent vaporization of water present in the material, and then, during only an intermediate period of the conversion, injecting live steam into the mass to accelerate the heating and saccharification.

5. A process for converting starch into hydrolyzed starch products, which comprises simultaneously stirring a commercially dry to moist mass of acidulated starch solids in a closed container, heating the mass from surfaces of the container and subjecting the mass to sufficient pressure from an externally applied gas substantially unreactive thereto to prevent vaporization of water present in the material, until the mass attains a temperature of the order of 100° C.; and then, while continuing such stirring and such heating, injecting live steam under pressure into the mass until its temperature is raised to one of the order of 130° C.

6. A process as described in claim 5, and thereafter holding the mass at a temperature of the order of 130° C. by continuing such stirring and such heating until a desired degree of saccharification is produced.

7. A process for converting starch into hydrolyzed starch products, which comprises simultaneously stirring a commercially dry to moist mass of acidulated starch solids in an enclosed reaction space, heating the mass therein from surfaces thereof at a temperature sufficient to saccharify the starch and injecting air into the space under a pressure sufficient to prevent vaporization of water present in the material, until hydrolysis has proceeded nearly to the stage of stiffening of the mass; and then, while continuing such stirring and such heating, injecting live steam under pressure into the mass to cause accelerated heating and saccharification whereby such stiffening is avoided.

8. A process for converting starch into hydrolyzed starch products, which comprises simultaneously stirring a commercially dry to moist mass of acidulated starch solids in an enclosed reaction space, heating the mass therein from surfaces thereof at a temperature sufficient to saccharify the starch and injecting nitrogen into the space under a pressure sufficient to prevent vaporization of water present in the material, until hydrolysis has proceeded nearly to the stage of stiffening of the mass; and then, while continuing such stirring and such heating, injecting live steam under pressure into the mass to cause accelerated heating and saccharification whereby such stiffening is avoided.

9. A process for converting starch continuously into hydrolyzed starch products which comprises, while forcing a commercially dry to moist mass of acidulated starch solids continuously through an elongated enclosed path for reaction, continuously stirring the mass and heating it from surfaces in said path at a temperature sufficient to saccharify the starch, continuously holding it while in said path under a gaseous counterpressure sufficient to prevent volatilization of water present in the material, and continuously injecting live steam under pressure into the advancing mass in a part of said path to accelerate the heating and saccharification of material therein.

10. A process as described in claim 9, the mass being held under said counterpressure by injecting a gas under pressure and substantially unreactive to the starch material into a part of said path.

11. A process as described in claim 9, the steam being injected at a zone of said path where the advancing mass tends to stiffen objectionably in the absence of steam.

MAX A. STAERKLE.
EMIL MEIER.

REFERENCES CITED

The following references are of record in the file of this patent:

UNITED STATES PATENTS

| Number | Name | Date |
|---|---|---|
| 248,904 | Wilson et al. | Nov. 1, 1881 |
| 279,354 | DeCastro | June 12, 1883 |
| 432,358 | Bergé | July 15, 1890 |
| 1,283,839 | McLaurin | Nov. 5, 1918 |
| 1,411,204 | Bright | Mar. 28, 1922 |
| 1,564,970 | Long | Dec. 8, 1925 |
| 1,784,402 | Wagner | Dec. 9, 1930 |
| 1,894,570 | Phillips | Jan. 17, 1933 |
| 2,148,016 | Gale | Feb. 21, 1939 |

OTHER REFERENCES

Radley: "Starch and Its Derivatives," N. Y. 1944, pages 214 and 215.